Patented Dec. 28, 1937

2,103,768

UNITED STATES PATENT OFFICE 2,103,768

ACID-PROOF SELF-HARDENING COMPOSITIONS

Karl Dietz, Frankfort-on-the-Main, and Karl Frank, Bad Soden in Taunus, Germany, assignors, by mesne assignments, to Pen-Chlor, Inc., Philadelphia, Pa., a corporation of Delaware No Drawing. Application April 5, 1935, Serial No. 14,918. In Germany April 14, 1934

10 Claims. (Cl. 106—22)

The present invention relates to acid-proof self-hardening compositions.

In our co-pending U. S. patent application Serial No. 541,736 filed June 2, 1931 now Patent No. 2,034,802, we have described a process of preparing phenol-aldehyde masses rapidly hardening in the cold to be used for linings and construction, which process consists in adding neutral aromatic sulfochlorides to a phenol-aldehyde resin which has only been condensed to such an extent that it is still in a liquid condition. It is thus possible to harden the artificial resins in the cold by the addition of a neutral substance.

Now we have found that the same purpose may also be attained by adding to the liquid phenol-aldehyde resins, at ordinary temperature, mineral acid esters of aromatic-aliphatic alcohol having a neutral reaction against water. Besides the neutral sulfuric acid esters or phosphoric acid esters of these alcohols, the neutral hydrochloric acid esters have been found particularly suitable and among these esters for instance the compounds, such as benzotrichloride benzalchloride, dichloromethylmetaxylene or paraxylylenechloride. Dibenzylsulfate may also be used. All these compounds are neutral substances which already in small quantities have a hardening action in the cold.

We have furthermore found that it is suitable to use a liquid phenol-formaldehyde resin in which at least 1.4 mols of formaldehyde are contained for 1 mol. of phenol. If these phenol-formaldehyde masses are used, there are obtained products which are stable not only against acids, but also against alkalies.

The neutral mineral acid esters are mixed with the liquid phenol-aldehyde resins either alone or together with filling materials, if desired, furthermore with the addition of substances having a good thermal conductivity, for instance, silicon, silicon alloys or graphite. Softening agents, such as benzyl alcohol, may also be added.

With the masses thus obtained there may be prepared cementations or coatings, furthermore also shaped bodies, such as stones, also filtering stones, which are solid, hard and resistant to pressure, friction and acid.

The following examples serve to illustrate the invention, but they are not intended to limit it thereto, the parts being by weight:

1. 10 parts of finely pulverized paratoluene-sulfochloride, 45 parts of silica and 45 parts of pulverized quartz are mixed with 30 parts by volume of liquid phenol-formaldehyde resin, 8 parts by volume of benzotrichloride and 2 parts by volume of benzyl alcohol (as softening agent). If a phenol-formaldehyde resin is used in which the proportion of phenol to formaldehyde is the same or smaller than 1 to 1.4, there are obtained products which have the property of being resistant to alkali, besides the stability to acid.

Instead of benzotrichloride there may also be used paraxylylenechloride; furthermore, the aromatic sulfochloride may be omitted and the mineral acid ester may be used alone.

2. 10 grams of dichloromethylmetaxylene and 10 grams of paratoluene-sulfochloride are mixed with 80 grams of pulverized quartz. This pulverized cement is mixed with 50 grams of a phenol-formaldehyde condensation product in which 1.4 or more mols. of formaldehyde are present for 1 mol. of phenol. This cement is self-hardening and resistant to alkali.

The aromatic sulfochloride may also be omitted from the afore-named mixture.

The amounts of the components given in the examples may be altered according to the industrial requirements. If a particularly thinly liquid mortar is required, the quantities of the phenol-formaldehyde condensation product are increased. If the mortar has to be stiff, the quantities are reduced.

We claim:

1. Acid-proof self-hardening compositions containing a liquid phenol-aldehyde resin capable of being hardened and a neutral ester of a mineral acid and an aromatic-aliphatic alcohol said ester being of a character and in an amount sufficient to render the composition self-hardening and stable against acids and alkalies.

2. Acid-proof self-hardening compositions containing a liquid phenol-aldehyde resin capable of being hardened in which the molecular proportion of phenol to formaldehyde is at the most 1:1.4, and a neutral ester of a mineral acid and an aromatic-aliphatic alcohol said ester being of a character and in an amount sufficient to render the composition self-hardening and stable against acids and alkalies.

3. Acid-proof self-hardening compositions containing a liquid phenol-aldehyde resin capable of being hardened and a neutral hydrochloric acid ester of an aromatic-aliphatic alcohol said ester being of a character and in an amount sufficient to render the composition self-hardening and stable against acids and alkalies.

4. Acid-proof self-hardening compositions containing a liquid phenol-aldehyde resin capable of being hardened and benzotrichloride in an amount sufficient to render the composition self-hardening and stable against acids and alkalies.

5. Acid-proof self-hardening compositions containing a liquid phenol-aldehyde resin capable of being hardened and dichloromethylmetaxylene in an amount sufficient to render the composition self-hardening and stable against acids and alkalies.

6. Acid-proof self-hardening compositions containing a liquid phenol-aldehyde resin capable of being hardened and para-xylylenechloride in an amount sufficient to render the composition self-hardening and stable against acids and alkalies.

7. Acid-proof self-hardening compositions containing a liquid phenol-aldehyde resin capable of being hardened in which the molecular proportion of phenol to formaldehyde is at the most 1:1.4, and a neutral hydrochloric acid ester of an aromatic-aliphatic alcohol said ester being of a character and in an amount sufficient to render the composition self-hardening and stable against acids and alkalies.

8. Acid-proof self-hardening compositions containing a liquid phenol-aldehyde resin capable of being hardened in which the molecular proportion of phenol to formaldehyde is at the most 1:1.4, and benzotrichloride in an amount sufficient to render the composition self-hardening and stable against acids and alkalies.

9. Acid-proof self-hardening compositions containing a liquid phenol-aldehyde resin capable of being hardened in which the molecular proportion of phenol to formaldehyde is at the most 1:1.4, and dichloromethylmetaxylene in an amount sufficient to render the composition self-hardening and stable against acids and alkalies.

10. Acid-proof self-hardening compositions containing a liquid phenol-aldehyde resin capable of being hardened in which the molecular proportion of phenol to formaldehyde is at the most 1:1.4, and para-xylylenechloride in an amount sufficient to render the composition self-hardening and stable against acids and alkalies.

KARL DIETZ.
KARL FRANK.